United States Patent [19]
Shaver

[11] Patent Number: 5,996,870
[45] Date of Patent: Dec. 7, 1999

[54] BICYCLE CARRIER

[76] Inventor: Tori Shaver, 3484 Highway 30 West, Pocatello, Id. 83201

[21] Appl. No.: 09/212,546

[22] Filed: Dec. 16, 1998

Related U.S. Application Data

[63] Continuation-in-part of application No. 08/906,724, Aug. 5, 1997, Pat. No. 5,884,826.

[51] Int. Cl.$^6$ .................................................. B60R 9/00
[52] U.S. Cl. ........................ 224/532; 224/324; 224/509; 224/525; 224/531; 224/537; 224/924
[58] Field of Search ................................ 224/532, 531, 224/924, 497, 501, 504, 505, 506, 509, 533, 537, 522, 523, 525, 324, 534; 211/5, 17, 18, 19; 248/292.12, 284.1

[56] References Cited

U.S. PATENT DOCUMENTS

| | | | |
|---|---|---|---|
| 1,585,871 | 5/1926 | Pels ............................................. | 224/524 |
| 1,796,354 | 3/1931 | Ahlberg ................................. | 248/282.1 |
| 1,807,371 | 5/1931 | Binns ......................................... | 224/499 |
| 1,853,608 | 4/1932 | Gundry ...................................... | 224/499 |
| 3,163,339 | 12/1964 | Merchant .................................. | 224/547 |
| 3,550,892 | 12/1970 | Propst .................................... | 248/282.1 |
| 4,171,077 | 10/1979 | Richard, Jr. ............................... | 224/500 |
| 4,430,922 | 2/1984 | Fog et al. ................................ | 248/282.1 |
| 4,568,051 | 2/1986 | Rosengren ............................. | 248/282.1 |
| 4,807,935 | 2/1989 | King .................................... | 297/411.38 |
| 5,052,605 | 10/1991 | Johansson ................................. | 224/324 |
| 5,094,373 | 3/1992 | Lovci .................................... | 224/42.08 |
| 5,443,189 | 8/1995 | Hirschfeld ................................ | 224/501 |
| 5,518,159 | 5/1996 | DeGuevara ............................... | 224/488 |
| 5,527,146 | 6/1996 | Allsop et al. ........................... | 414/462 |
| 5,529,231 | 6/1996 | Burgess .................................... | 224/502 |
| 5,570,825 | 11/1996 | Cona ...................................... | 224/495 |
| 5,664,717 | 9/1997 | Joder ....................................... | 224/502 |
| 5,690,259 | 11/1997 | Montani ................................... | 224/310 |
| 5,690,260 | 11/1997 | Aikins et al. ............................ | 224/924 |
| 5,762,248 | 6/1998 | Englander et al. ...................... | 224/324 |
| 5,775,555 | 7/1998 | Bloemer et al. ......................... | 224/531 |
| 5,839,373 | 11/1998 | Lin ......................................... | 108/140 |
| 5,862,966 | 1/1999 | Mehls ..................................... | 224/504 |
| 5,871,131 | 2/1999 | Low et al. .............................. | 224/537 |

FOREIGN PATENT DOCUMENTS

| | | | |
|---|---|---|---|
| 404658 | 12/1909 | France ................................... | 224/549 |
| 83898 | 4/1954 | Norway ................................. | 224/499 |
| 93810 | 12/1938 | Sweden ................................. | 224/533 |
| 9615 | 11/1915 | United Kingdom ................... | 224/549 |
| 341835 | 1/1931 | United Kingdom ................... | 224/553 |

*Primary Examiner*—Gregory M. Vidovich
*Assistant Examiner*—Maerena W. Brevard
*Attorney, Agent, or Firm*—Ormiston Korfanta & Holland, PLLC

[57] ABSTRACT

A bicycle carrier and a vehicle mounted bicycle rack that carries bicycles vertically across the back of the vehicle, rather than horizontally out from the back of the vehicle as in conventional carriers. The bicycle carrier includes a cradle arm that cradles the front tire of the bicycle and one or both of a tray positioned at an angle of 45° to 135° with respect to the cradle arm and a bicycle frame holder that is configured to receive a frame member of the bicycle. The cradle arm extends out from the back of the vehicle when it is mounted to a rack at the rear of a vehicle. Most of the weight of the bicycle is supported by the cradle arm as the bicycle "hangs" from its front wheel. The bicycle rack of the present invention combines a vertical orientation bicycle carrier with a rear mounted swing out type vehicle equipment rack available commercially under the name REVA Rack™.

17 Claims, 12 Drawing Sheets

BICYCLE CARRIER

CROSS REFERENCE TO RELATED APPLICATION

This is a continuation in part of U.S. application Ser. No. 08/906,724 filed Aug. 5, 1997 now U.S. Pat. No. 5,884,826, entitled Vehicle Equipment rack.

FIELD OF THE INVENTION

The present invention relates generally to vehicle equipment racks and, more particularly, to a rear mounted swing-out type vehicle equipment rack and bicycle carrier in which the bicycles are carried vertically.

BACKGROUND

The dramatic increase in the use of sport and recreation equipment during the 1980s and 1990s has created a substantial market for vehicle mounted equipment racks. Although exercisers and outdoor enthusiasts rack everything from kayaks and canoes to sailboards and surfboards, bicycles are still one of the most common pieces of equipment carried on cars, pick-up trucks and sport utility vehicles. A variety of different vehicle equipment racks and bicycle carriers are commercially available. Top mounted racks are the most popular. Top mounted racks, however, are often hard to use, particularly with bicycles and on taller vehicles like sport utility vehicles and pick-up trucks. Rear mounted racks are less popular than top mounted racks despite the fact that they are easier to reach, perhaps because some rear mounted racks must be removed to access the rear of the vehicle while others afford only limited access to the rear of the vehicle.

Bicycles are carried horizontally, that is with the wheels aligned horizontally with one another, on both top and rear mount equipment racks. The horizontal orientation of the bicycles on rear mounted racks limits the number of bikes that may be carried because each bike increases the length of the vehicle and each bike progressively increases the torque load on the rack. In the rear mounted swing out rack shown and described in U.S. Pat. No. 5,664,717, for example, each bicycle is carried behind the preceding bicycle. Each bicycle (or empty bicycle carrying bracket), therefore, extends the length of the vehicle by approximately 6 inches and progressively increases the torque loading in direct proportion to the ever increasing distance from the rear of the vehicle.

SUMMARY OF THE INVENTION

The present invention is directed to a bicycle carrier and a vehicle mounted bicycle rack that carries bicycles vertically across the back of the vehicle, rather than horizontally out from the back of the vehicle as in conventional carriers. Vertical or vertical orientation as those terms are used herein describes the orientation of a bicycle when one wheel is positioned over the other wheel. The bicycle carrier consists of a first member mountable to a vehicle equipment rack, the first member being configured to receive the bicycle in a vertical orientation, and a second member that cooperates with the first member to help maintain the vertical orientation of the bicycle. In one exemplary embodiment of the invention, the first member is a cradle arm that cradles the front tire of the bicycle. The cradle arm extends out from the back of the vehicle when it is mounted on a vehicle equipment rack at the rear of the vehicle. Most of the weight of the bicycle is supported by the cradle arm as the bicycle "hangs" from its front wheel. In this exemplary embodiment, the second member is one or both of a tray positioned at an angle of 45° to 135° with respect to the cradle arm and a bicycle frame holder that is configured to receive a frame member of the bicycle.

The bicycle rack of the present invention combines a vertical orientation bicycle carrier with a rear mounted swing out type vehicle equipment rack available commercially under the name REVA Rack™. The bicycle rack includes a stationary member and a plurality of rotatably interconnected movable members operatively coupled to the stationary member. The movable members rotate between a closed position in which the movable members are aligned along the rear of the vehicle and an open position in which the movable members are angularly offset from one another. The bicycle carrier, which is configured to hold a bicycle in a vertical orientation, is supported on the equipment rack by an upright attached to one of the movable members. When the movable members are fully extended, the bicycle carrier swings out along the side of the vehicle to allow easy access to the rear of the vehicle. A trailer hitch or other suitable coupler is attached to the stationary member to connect the equipment rack to a receiver hitch or other coupler on the vehicle.

The invention, as summarized above and defined in the claims at the end of this Specification, may be better understood with reference to the drawings and the following detailed description of the preferred embodiment.

DETAILED DESCRIPTION

Figure 2:
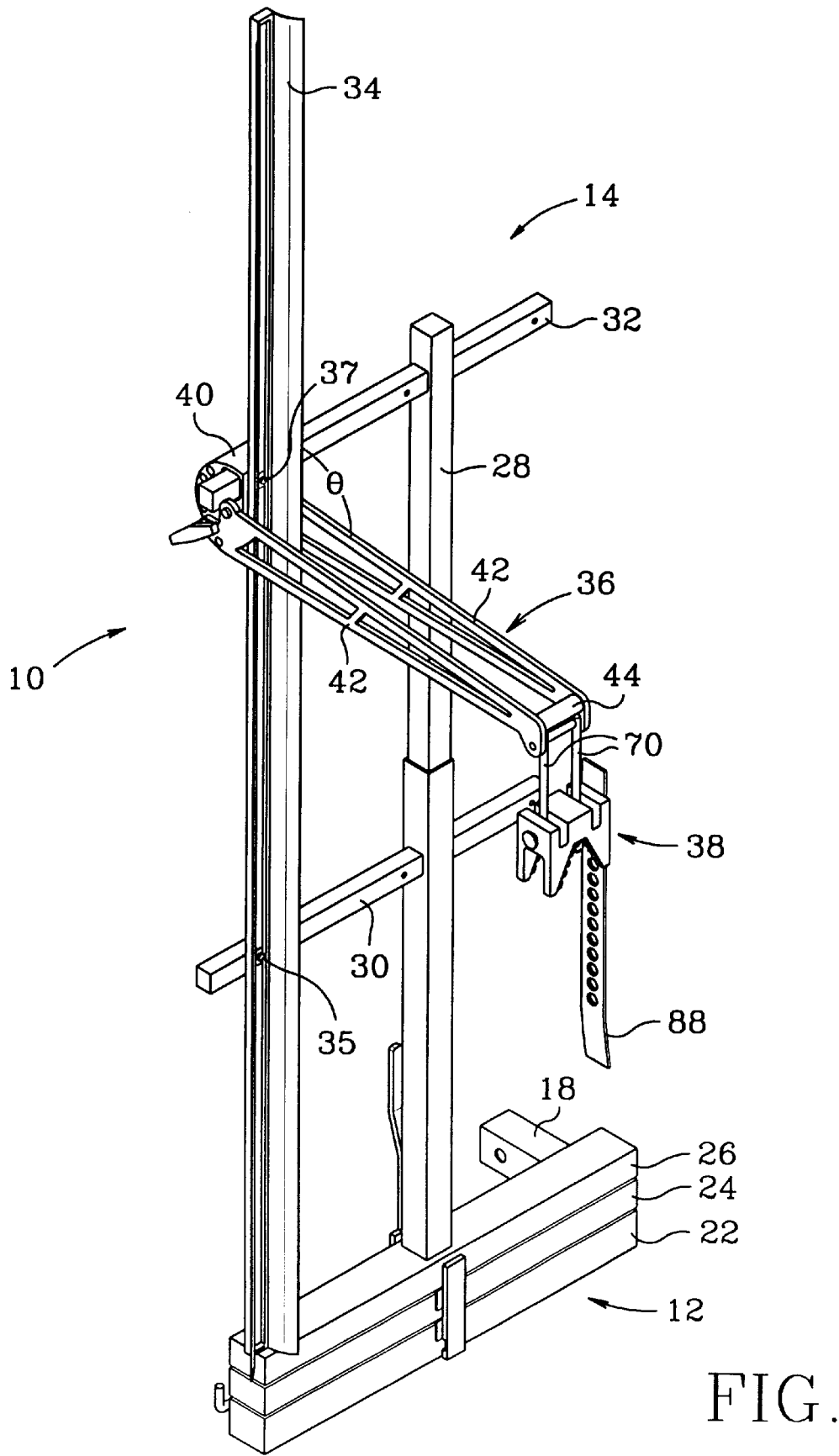
FIG. 2 is a perspective view of a single sided rack that can hold up to three bicycle carriers with one carrier in place on the rack.
Figure 3:
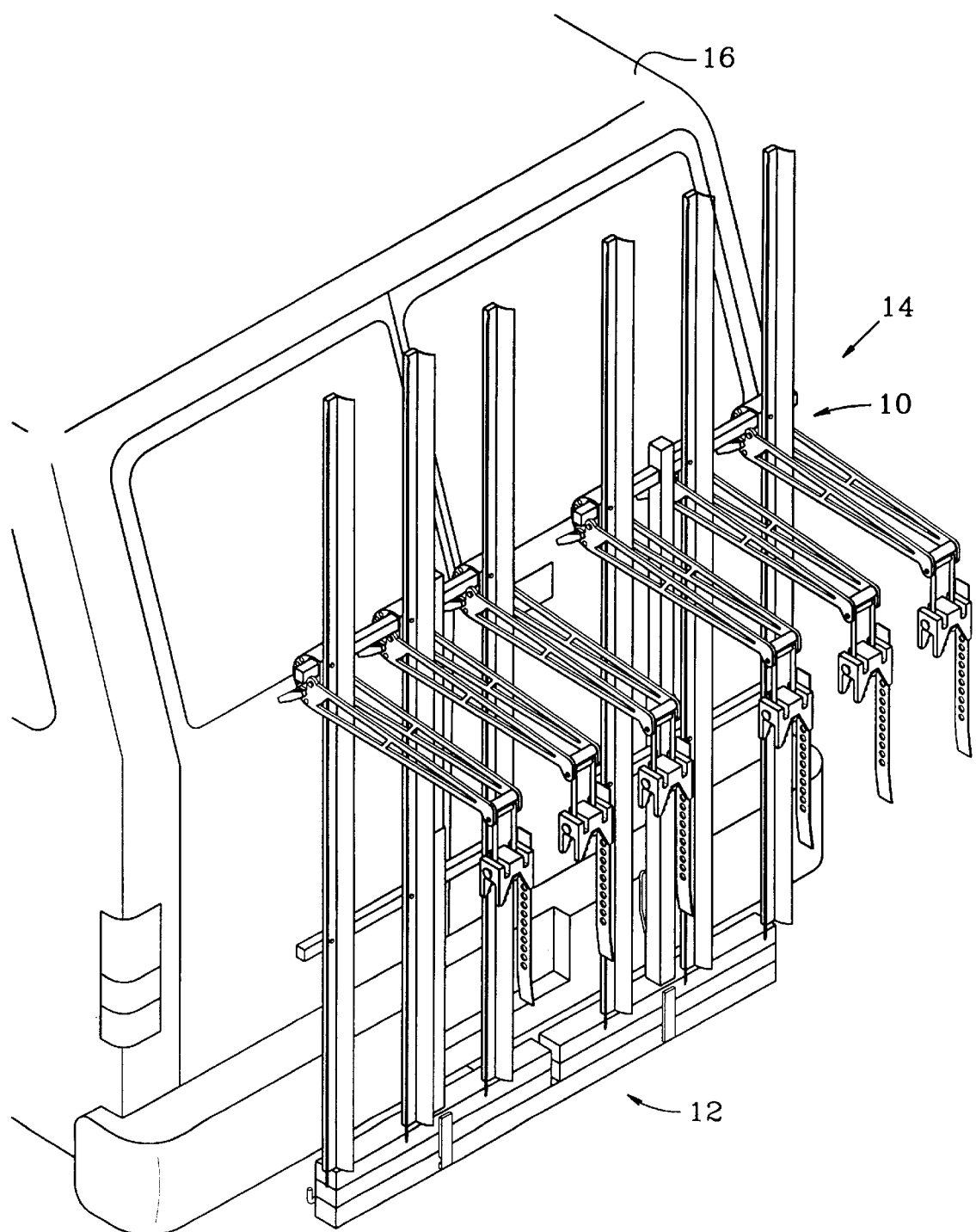
FIG. 3 is a perspective view of a double sided rack that can hold up to six bicycle carriers with six carriers in place on the rack.
Figure 4:
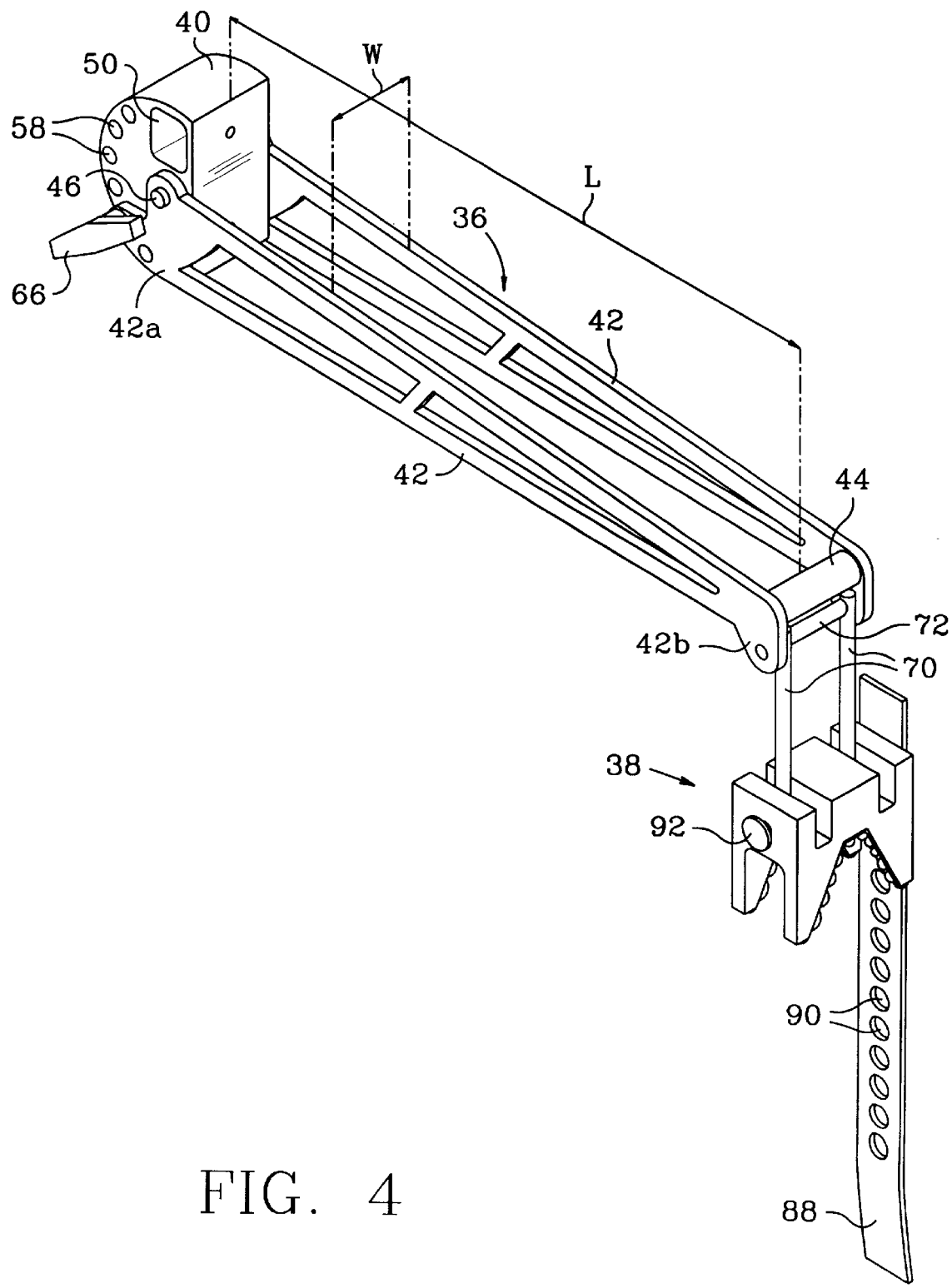
FIGS. 4 and 5 are detail perspective views of the bicycle carrier of FIGS. 1–3. The retaining pin is inserted in FIG. 4 and removed in FIG. 5.
Figure 5:
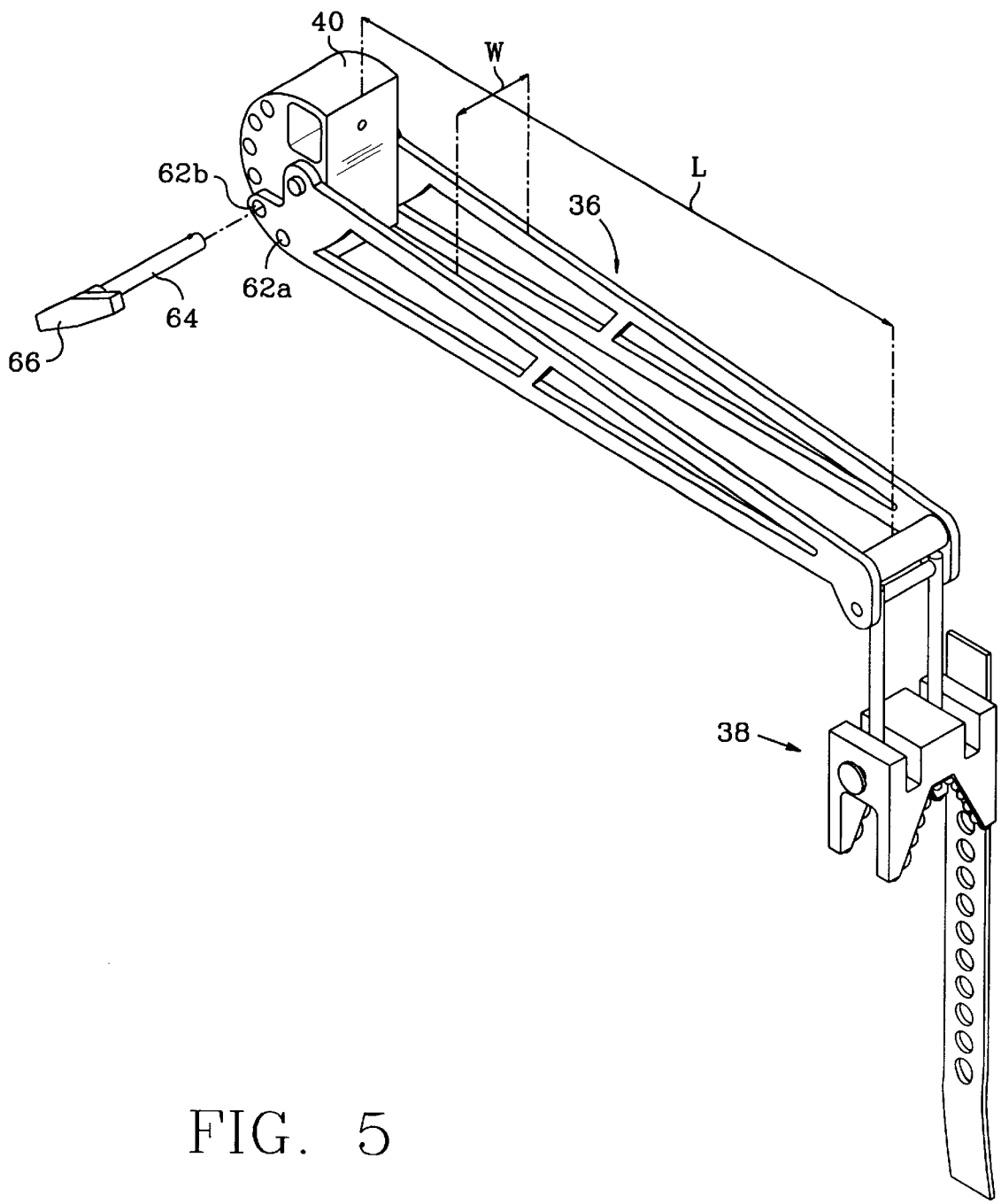
Figure 6:
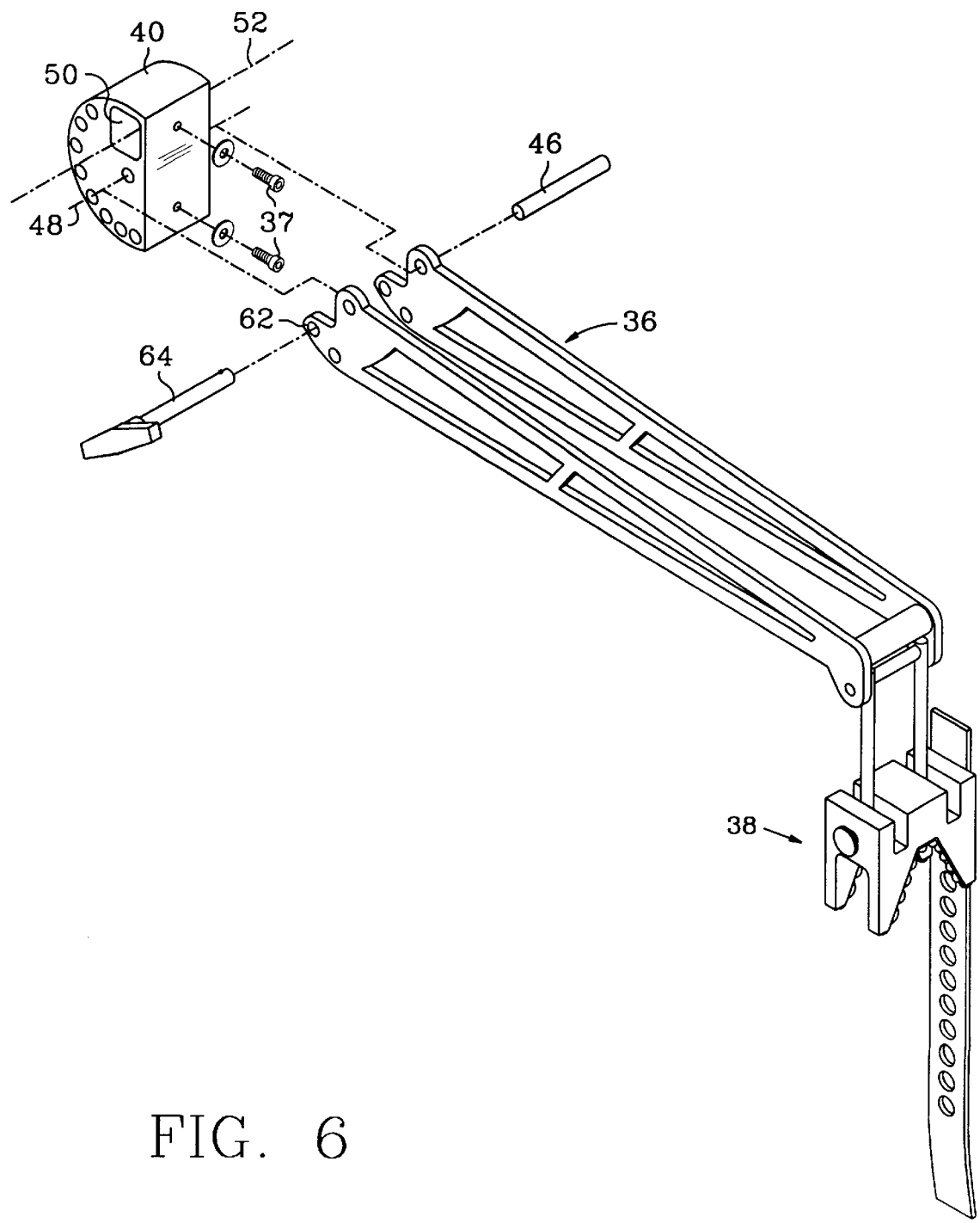
FIG. 6 is a partial exploded view of the bicycle carrier of FIGS. 4 and 5.
Figure 7:
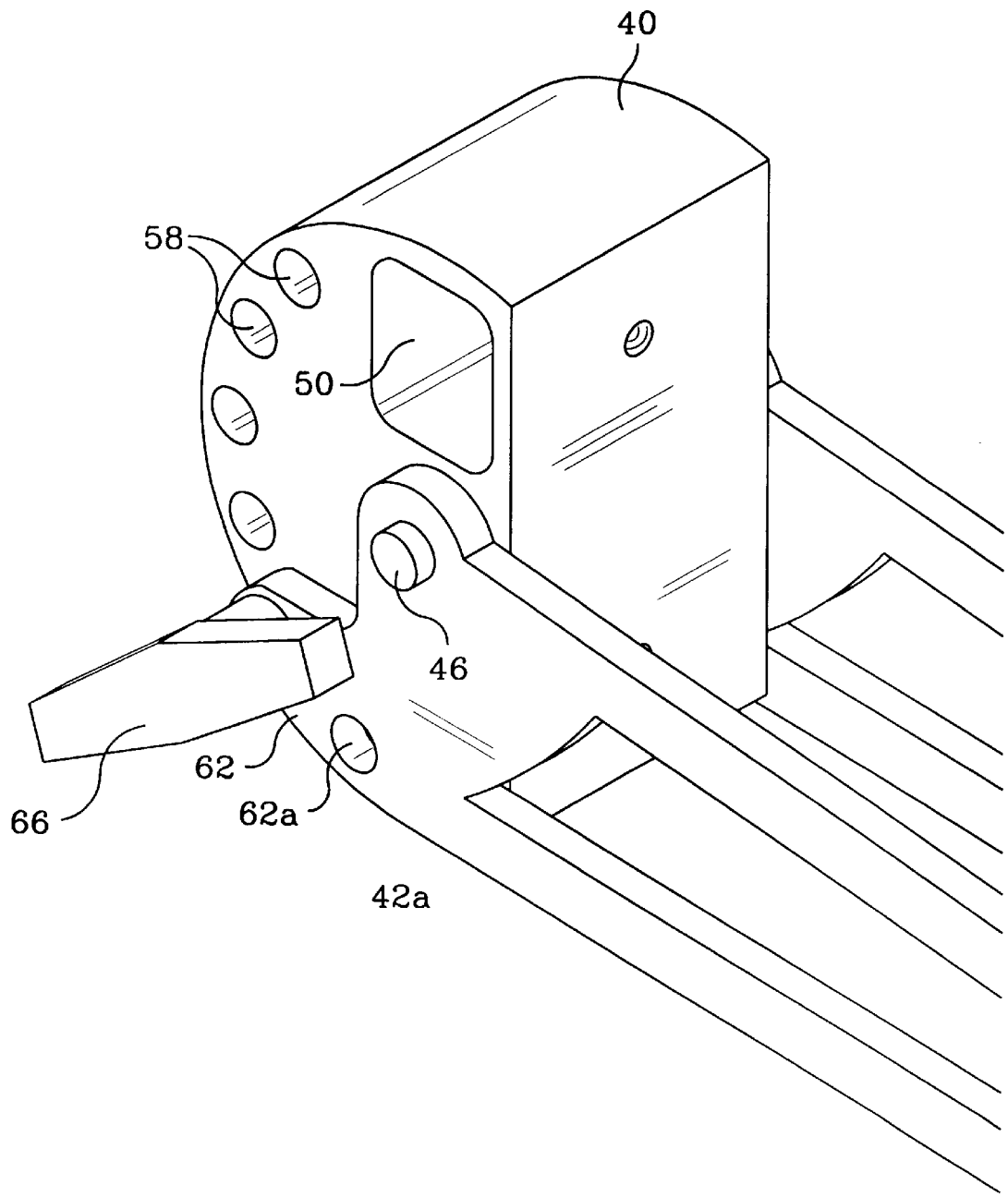
FIG. 7 is a detail perspective view of the mounting bracket assembly of the carrier of FIGS. 4 and 5.

The bicycle carrier of the present invention was developed for use with a rear mounted vehicle equipment rack available commercially under the name REVA Rack™. The REVA Rack™ features a set of swing out arms that allow easy access to the rear of the vehicle. Details of the structure and operation of the REVA Rack™ are described in U.S. patent application Ser. No. 08/906,724 entitled Vehicle Equipment Rack, which is incorporated herein by reference. Two versions of the REVA Rack™ are illustrated in FIGS. 2 and 3. The single side version shown in FIG. 2 holds up to three bicycle carriers. The double sided version shown in FIG. 3 holds up to six bicycle carriers.

Figure 1A:
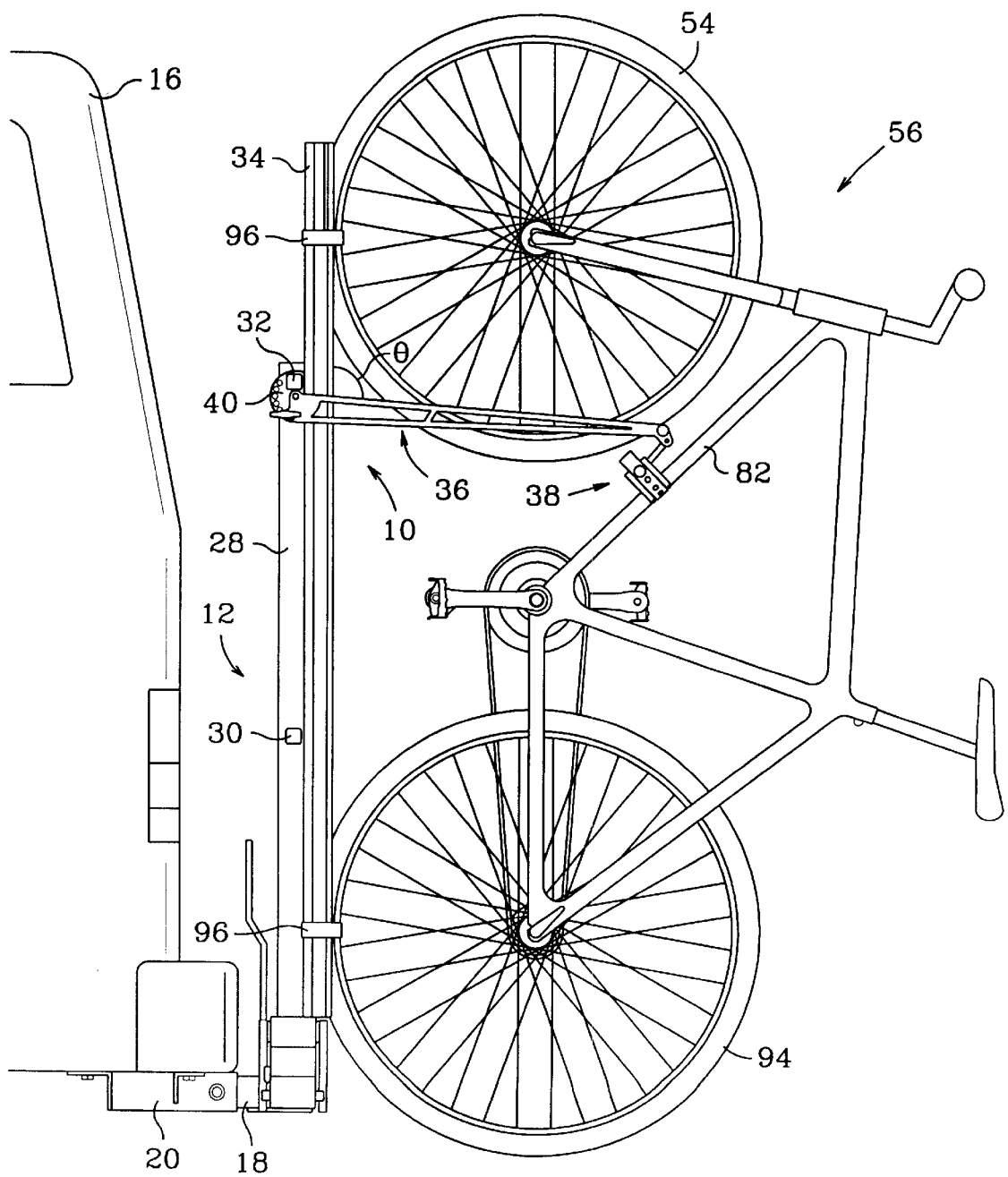
FIG. 1A is a side view of a bicycle carrier and equipment rack constructed according to one embodiment of the invention showing the rack installed on the vehicle and a bicycle in place on the carrier.
Figure 1B:
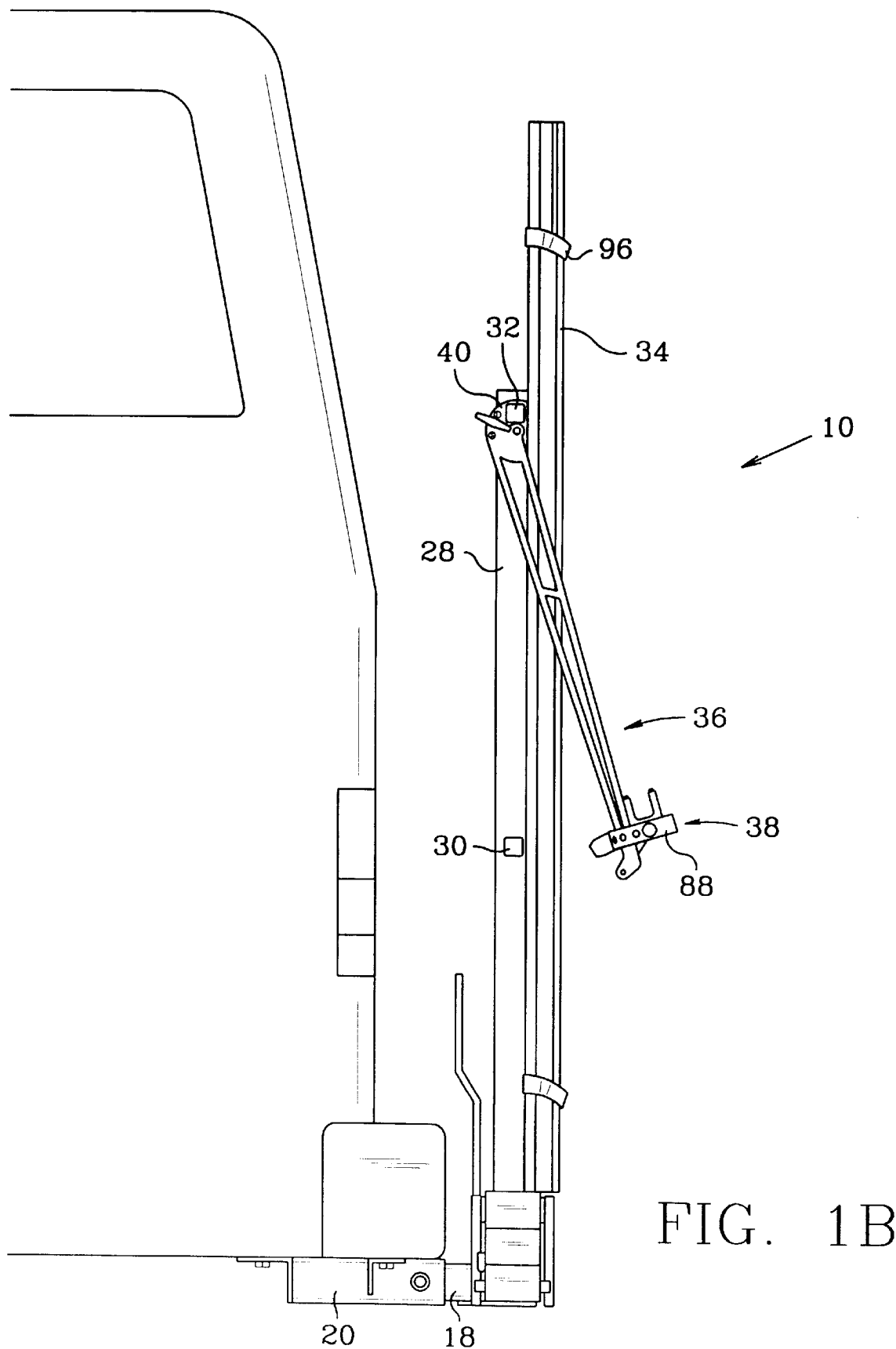
FIG. 1B is a side view of a bicycle carrier and equipment rack constructed according to one embodiment of the invention showing the carrier in the down and stowed position.

Referring now to FIGS. 1–3, bicycle carrier 10 is mounted to equipment rack 12. The combined assembly that includes bicycle carrier 10 and equipment rack 12 is designated bicycle rack 14. Equipment rack 12 is mounted on a vehicle 16 by inserting a tongue 18 into a conventional receiver type trailer hitch 20 at the rear of vehicle 16. Equipment rack 12 includes three rotatably interconnected members 22, 24 and 26. Movable upper arm 26 is operatively connected to movable middle arm 24 which is operatively connected to stationary lower member 22. The bearing and drive train components (not shown) that form the operative interconnection between arms 22, 24 and 26 are described in patent application Ser. No. 08/906,724. Tongue 18 is attached at right angles to lower member 22. Upright 28 is mounted to and extends up from upper arm 26. A first accessory arm 30 is attached to and extends horizontally out from the lower portion of upright 28. A second accessory arm 32 is attached to and extends horizontally out from the upper portion of upright 28.

In the preferred embodiment, bicycle carrier 10 includes a tray 34, cradle arm 36, frame holder 38 and mounting bracket 40. Carrier 10 is mounted to equipment rack 12 through semicircular mounting bracket 40. Tray 34 is fastened in a vertical orientation to lower accessory arm 30 at lower fastener 35 and upper accessory arm 32 at upper fastener 37. Upper fastener 37 also fastens tray 34 to mounting bracket 40 and secures mounting bracket 40 in position on upper accessory arm 32. Tray 34 represents generally any conventional bicycle carrier tray such as those used on horizontal roof rack type bicycle carriers.

Referring now to the more detailed views of FIGS. 4–7, cradle arm 36 includes elongated opposing side members 42 and cross member 44. Side members 42 are mounted at a first end 42a for rotation relative to mounting bracket 40 on a first pivot 46. Pivot 46 also serves as a cross member in cradle arm 36 to secure the ends 42a of side members 42. Pivot 46 extends through the center of semicircular mounting bracket 40 so that cradle arm 36 pivots on an axis 48 at the center of bracket 40. A mounting hole 50 extends through mounting bracket 40 adjacent to axis 48. Hole 50 is characterized by a centerline 52. Preferably, centerline 52 is positioned directy over axis 48 to position hole 50 directly over pivot 46. Mounting hole 50 is sized and shaped to closely match the outside size and shape of upper accessory arm 32 so that bracket 40 will slide easily but fit snugly on arm 32. Cross member 44 extends between and secures second ends 42b of side members 42. Ends 42a and 42b of side members 42 are also used to designate the respective first and second ends of cradle arm 36.

Side members 42 are spaced apart a distance slightly greater than the width of bicycle tire 54. (Bicycle tire 54 is shown in FIG. 1.) That is, the width W of cradle arm 36 is made slightly greater than the width of bicycle tire 54. The length L of cradle arm 36 is slightly less than the diameter of bicycle tire 54. This sizing of cradle arm 36 allows bicycle tire 54 to rest on cross member 44 so that cradle arm 36 carries substantially all of the weight of bicycle 56.

Figure 8:
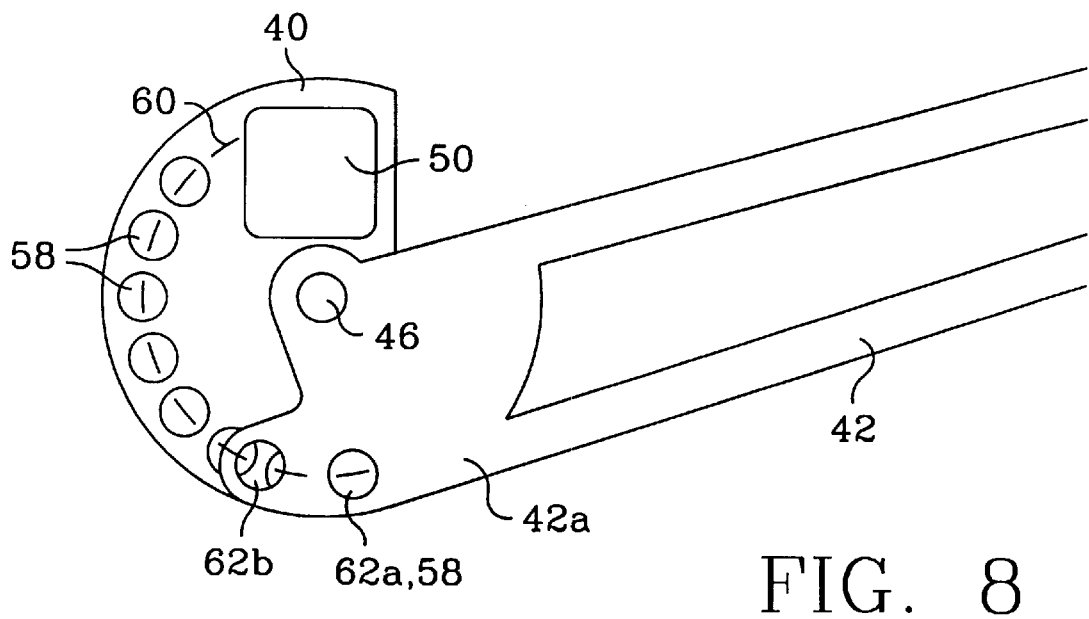
FIGS. 8 and 9 are detail side views of the mounting bracket showing different cradle arm positions.
Figure 9:
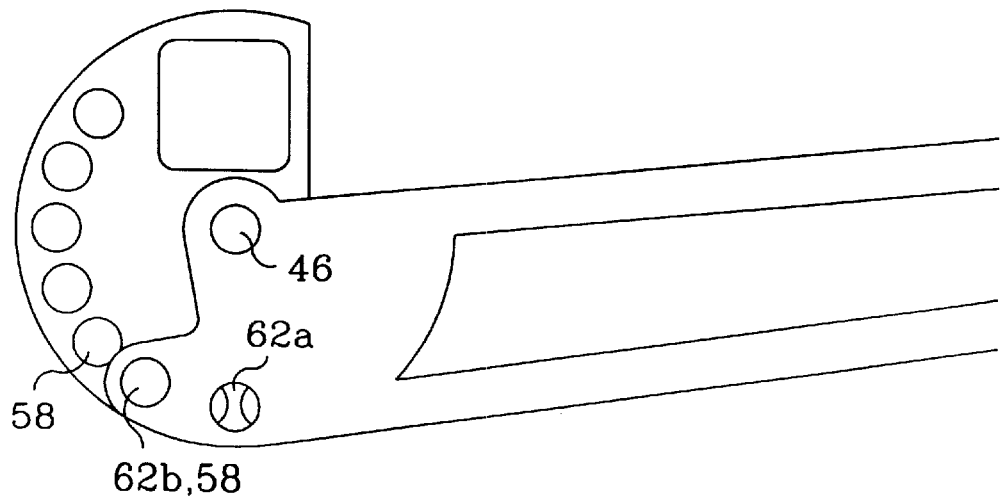

Referring now also to FIGS. 8 and 9, a series of adjusting holes 58 are formed along the arcuate perimeter 60 of mounting bracket 40. A pair of adjusting holes 62a and 62b are also formed in an extension piece 62 at first ends 42a of cradle arm side members 42. Cradle arm 36 is fixed into the desired position on bracket 40 by inserting a pin 64 through one of the holes 62a, 62b in cradle arm 36 and into one of the adjusting holes 58 in bracket 40. In this way, the position of cradle arm 36 may be adjusted to accommodate different size bicycles, to stagger handlebars vertically so that the bicycles can be mounted closer together and to lower cradle arm 36 down against tray 34 when the bicycle carrier is not in use. Cradle arm 36 is shown in the down/stowed position in FIG. 1B. Two adjusting holes 62a and 62b are preferred for cradle arm 36 to increase the degree of adjustability that is available from holes 58 on bracket 40. In the embodiment shown in the drawings, adjusting holes 62a and 62b are spaced apart 1.5 times the spacing of holes 58 in bracket 40. This provides for two times the degree of adjustability of only one adjusting hole. One of the adjusting holes 62a or 62b is centered between two of the holes 58 when the other adjusting hole 62a or 62b is aligned with a hole 58. For ease of operation, pin 64 is fitted with a handle 66.

Figure 10:
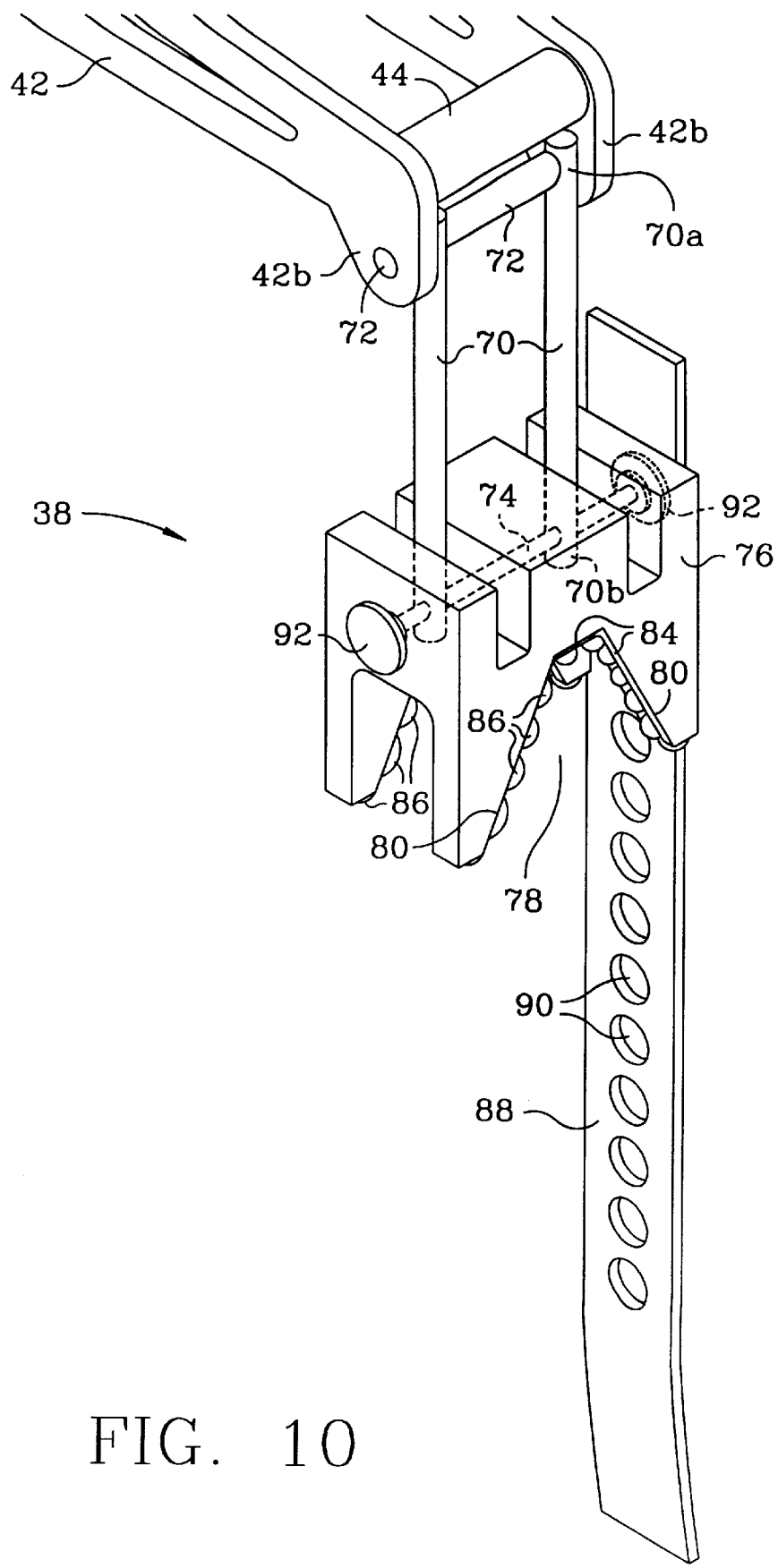
FIG. 10 is a detail perspective view of the bicycle frame holder assembly of the carrier of FIGS. 4 and 5.
Figure 11:
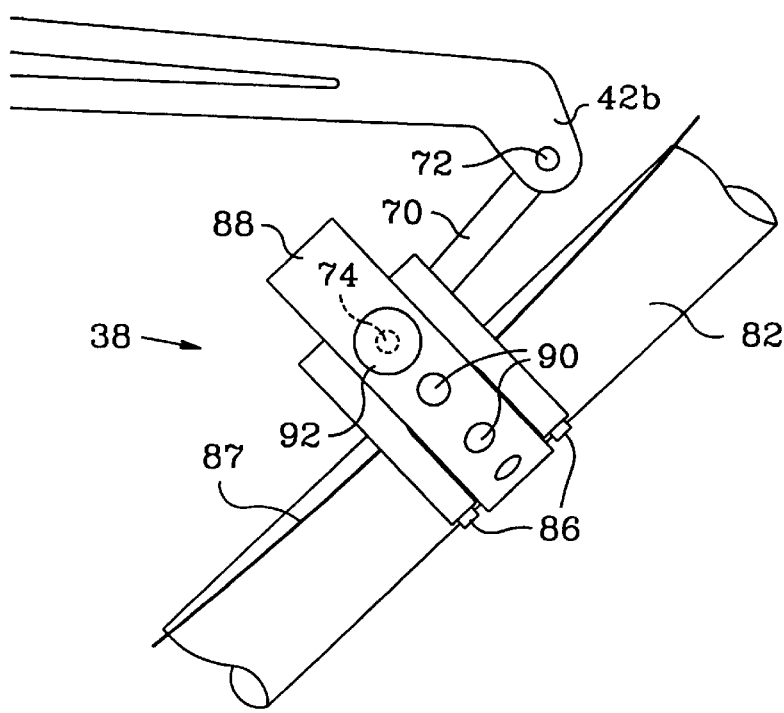
FIGS. 11 and 12 are detail side views of the frame holder showing different bicycle frame and holder positions.

Referring to FIG. 10, bicycle frame holder 38 is mounted at the second end 42b of cradle arm 36. Frame holder 38 is mounted somewhat away from the end of cradle arm 36 by extensions 70. Extensions 70 should be long enough, typically about 4.5 inches, so that frame holder 38 can swing in under cradle arm 36 and out away from cradle arm 36 as necessary to accommodate different bicycle frame designs and different rotational positions of cradle arm 36. Frame holder 38 is mounted for rotation relative to cradle arm 36 on a second pivot 72 that extends between the ends 42b of cradle arm side members 42. First ends 70a of extensions 70 are attached to second pivot 72. Frame holder 38 is mounted for rotation relative to extensions 70 on a third pivot 74 that extends through a base portion 76 of holder 38. Second ends 70b of extensions 70 are attached to third pivot 74.

Frame holder 38 is a blocky member that includes a base portion 76 and an opening 78 defined by generally V-shaped inside surfaces 80. As shown in FIGS. 1 and 10–13, bicycle frame member 82 fits into opening 78 and is held against surfaces 80 when bicycle 56 is loaded into carrier 10. An optional liner 84 is affixed to or made integral with inside surfaces 80. Liner 84 is designed to protect brake and shifter cables that run along frame member 82. Liner 84 includes a series of beads 86 that bear on bicycle frame member 82 while providing spaces for brake and shifter cables. Beads 86 are spherical to readily allow cables into the spaces between the beads, rather than pinching the cables between the beads and bicycle frame member 82. Other shapes may also be used. What is important is that each bead 86 contact frame member 82 over a relatively small area so that any cables 87 running along frame member 82 will be guided into the spaces between the beads 86.

As best seen in FIGS. 1 and 11–13, bicycle frame member 82 is secured in position in holder 38 with a flexible strap 88. Strap 88 extends from one side of holder 38 to the other across opening 78. Holes 90 are formed in strap 88. Posts 92 are formed on opposing sides of the base portion 76 of holder 38. Strap 88 is secured to holder 38 by inserting posts 92 through holes 90. The exposed ends of posts 92 are, preferably, enlarged to help secure the strap to the posts. It is desirable to make strap 88 flexible or elastic so that it may be stretched around the bicycle frame member 82 across holder opening 78 to maintain constant pressure on frame member 82. A series of holes 90 are formed in strap 88 as necessary or desired to accommodate different size frame members 82 or different size holders 38.

Referring again to FIGS. 1–3, carrier 10 is mounted to equipment rack 12 by sliding mounting bracket 40 on to upper accessory arm 32. Bracket 40 is secured against lateral movement on arm 32 by upper fastener 37. Tray 34 may be installed before or after carrier 10 is mounted to equipment rack 12. Tray 34 is installed by placing tray 34 between side members 42 of cradle arm 36 and fastening tray 34 to mounting bracket 40. Tray 34 is also fastened to upper accessory arm 32 and lower accessory arm 30. Cradle arm 36 is moved up to the desired extended position and secured in place by inserting pin 64 through adjusting hole 62a or 62b in cradle arm 36 and one of the adjusting holes 58 in bracket 40. Cradle arm 36 is positioned at or near horizontal so that tray 34 and cradle arm 36 are positioned generally perpendicular to one another. Tray 34 need not be perfectly vertical, cradle arm 36 need not be perfectly horizontal and the two need not be perfectly perpendicular to one another. The orientation of cradle arm 36 and tray 34 will vary depending on any number of factors such as the size of the bicycles carried, the size of the front tire of the bicycles carried, and the type of vehicle equipment rack on which the carrier is mounted. Cradle arm 36 and tray 34 should be sufficiently perpendicular to one another to allow cradle arm 36 to support substantially all of the weight of bicycle 56. It is expected that an angle θ (shown in FIGS. 1A and 2) between cradle arm 36 and tray 34 of 45° to 135° will, in most situations, allow cradle arm 36 to support substantially all of the weight of bicycle 56.

Once carrier 10 is secured to equipment rack 12 and cradle arm 36 extended, bicycle 56 is lifted into position so that the front tire 54 rests in cradle arm 36 and against the top part of tray 34. Rear tire 94 rests against the bottom part of tray 34. Tires 54 and 94 are held in position against tray 34 with hold down straps 96.

Figure 12:
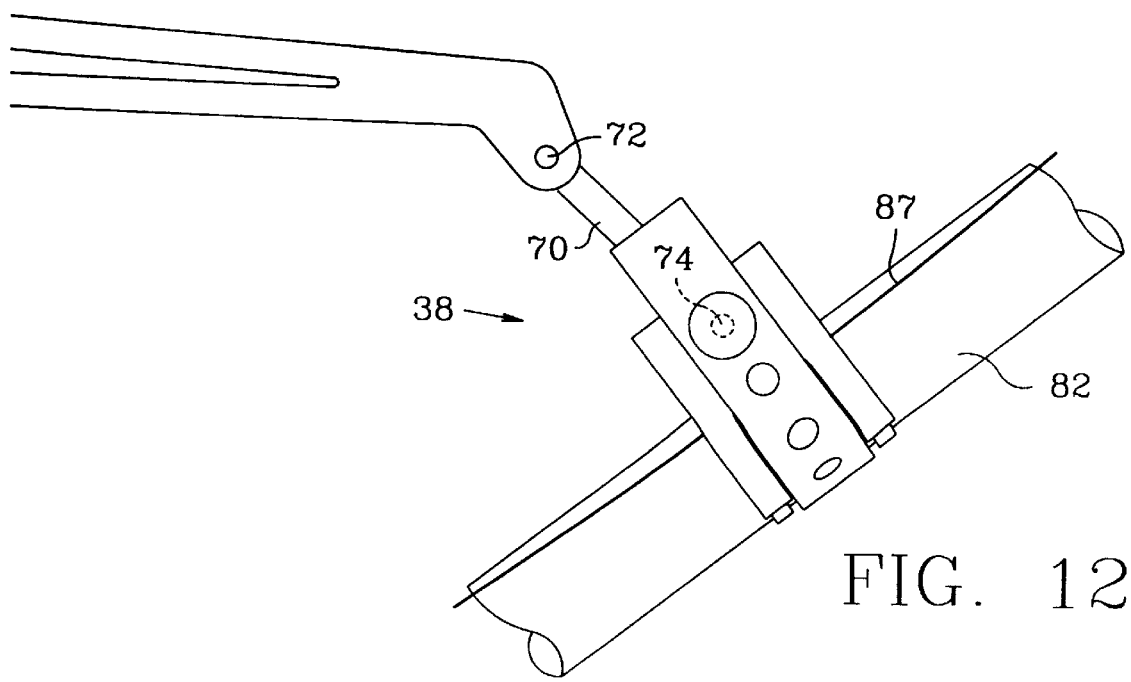
Figure 13:
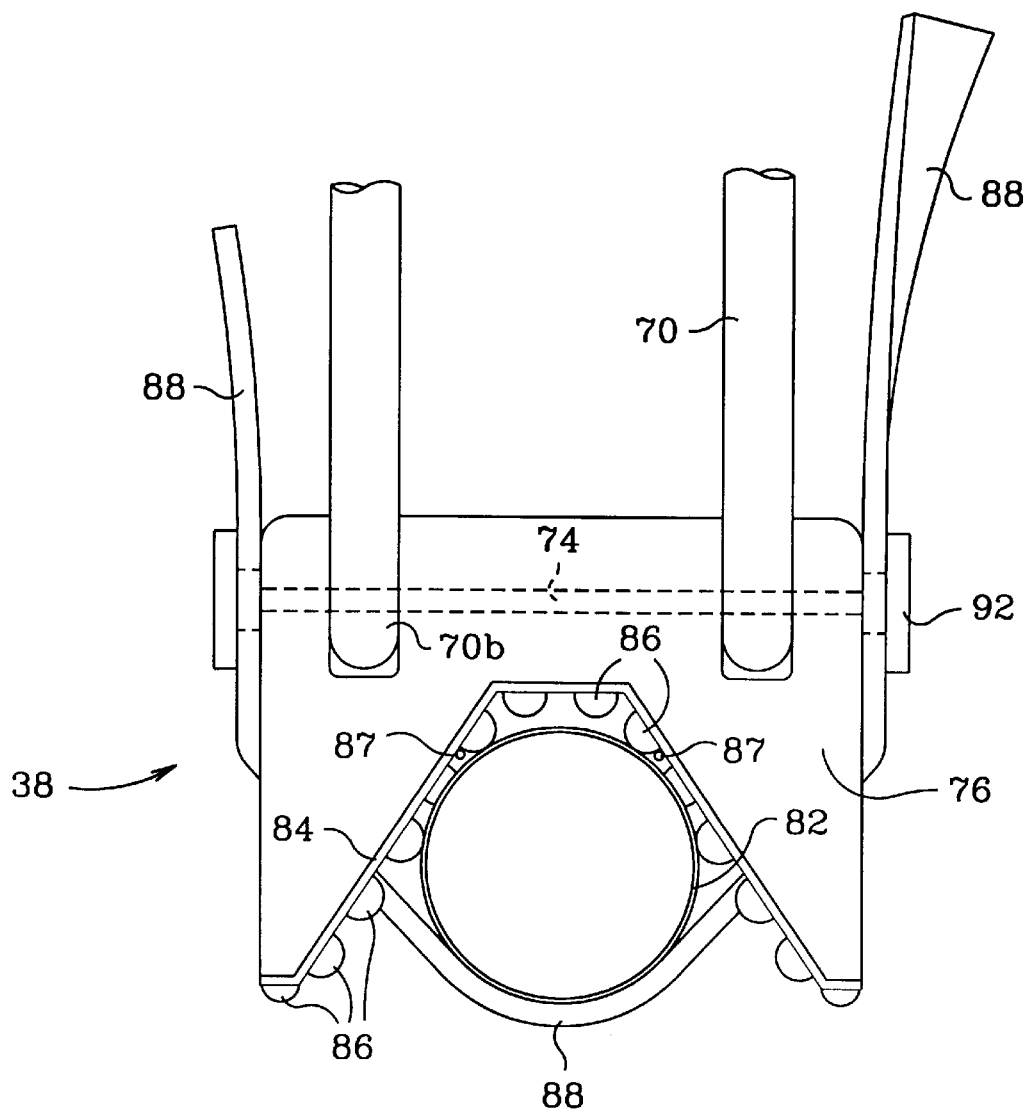
FIG. 13 is a detail end view of the frame holder showing the position of the bicycle frame holder and cables in the holder.

Although the invention has been shown and described with reference to the foregoing preferred embodiment, various other embodiments of the invention are possible. For example, a primitive version of carrier 10 is shown in FIG. 12 of patent application Ser. No. 08/906,724 wherein the cradle arm is braced against the lower accessory arm, rather than cantilevered as in the preferred embodiment. The invented bicycle carrier may not need a tray 34 and/or a frame holder 38 in all situations. It may be possible to stabilize bicycle 56 against the components of rack 12 and eliminate tray 34 altogether. Tray 34 need not be a single full length tray as described for the preferred embodiment. Tray 34 may consist of one or two shorter segments that are just long enough to control rotation and side to side movement. Cradle arm 36 may or may not include a frame holder 38 depending on the size or style of bicycle 56. Also, the invented carrier is not limited to use with the REVA Rack™. The carrier may be used with other vehicle equipment racks where it is necessary or desirable to carry the bicycles vertically. It is to be understood, therefore, that these and other embodiments may be made without departing from the spirit and scope of the invention as defined in the following claims.

What is claimed is:

1. A bicycle carrier, comprising:
   a mounting bracket mountable to a vehicle equipment rack;
   a cradle arm having a first end, an opposing second end and an opening between the first end and the second end, the first end connected to the mounting bracket and the opening having a width greater than the width of a tire on the bicycle and a length less than the diameter of the tire on the bicycle;
   a bicycle frame holder mounted to the second end of the cradle arm; and
   an extension interposed between the frame holder and the second end of the cradle arm to hold the frame holder away from the second end of the cradle arm.

2. The bicycle carrier according to claim 1 wherein the holder includes a generally V shaped surface defining an opening for receiving the bicycle frame member.

3. The bicycle carrier according to claim 2, further comprising a strap operatively connected to the holder to hold a frame member of the bicycle in the opening against the V shaped surface.

4. The bicycle carrier according to claim 3, wherein the operative connection comprises a post on each side of the holder fitted into holes in the strap.

5. The bicycle carrier according to claim 2 wherein the holder further comprises a liner lining at least a portion of the V shaped surface, the liner having a plurality of beads projecting therefrom to bear on the bicycle frame member when a bicycle is in place on the carrier.

6. The bicycle carrier according to claim 1, further comprising a tray cooperating with the cradle arm to carry a bicycle in a vertical orientation.

7. The bicycle carrier according to claim 1, wherein the bicycle frame holder is rotatably mounted to the second end of the cradle arm.

8. A bicycle carrier, comprising:
   a mounting bracket having a mounting hole therethrough sized and shaped to allow the mounting bracket to slide easily but fit snugly on a vehicle equipment rack and a plurality of positioning holes therethrough disposed along an arcuate perimeter of the bracket; and
   a cradle arm rotatably mounted to the bracket, the cradle arm comprising a pair of elongated opposing side members each having a first end and a second end, and a cross member connected between the second ends of the side members, the first ends of the side members rotatable connected to the mounting bracket wherein the side members, cross member and mounting bracket define an opening having a width greater than the width of a tire on a bicycle and a length less than the diameter of the tire on the bicycle, and at least one hole through the first end of the cradle arm, the cradle arm rotatable between a first position in which the hole in the cradle arm is aligned with a first one of the positioning holes in the bracket and a second position in which the hole in the cradle arm is aligned with a second one of the positioning holes in the bracket.

9. The bicycle carrier according to claim 8 wherein the cradle arm rotates about an axis through the center of the mounting bracket.

10. The bicycle carrier according to claim 8, wherein the mounting bracket comprises a semicircular elongated disk shaped mounting bracket.

11. A rear mounted vehicle bicycle rack, comprising:
   a stationary member;
   a coupler operatively connected to the stationary member, the coupler configured to connect the rack to the rear of the vehicle;
   a plurality of rotatably interconnected movable members operatively coupled to the stationary member, the movable members rotatable between a first position in which the movable members are aligned and a second position in which at least two of the movable members are angularly offset from one another;
   an upright attached to one of the movable members; and a bicycle carrier supported by the upright, the bicycle carrier configured to support a bicycle in a vertical orientation on the equipment rack.

12. The bicycle rack according to claim 11, wherein the bicycle carrier comprises a cradle arm extending in a generally horizontal orientation when the bicycle is in place in the carrier.

13. The bicycle rack according to claim 12, wherein the cradle arm includes a first end, an opposing second end and an opening between the first end and the second end, the opening having a width greater than the width of a tire on the bicycle and a length less than the diameter of the tire on the bicycle.

14. The bicycle rack according to claim 13, further comprising a tray operatively connected to the first end of the cradle arm, the tray positioned at an angle of 45° to 135° with respect to the cradle arm when the bicycle is in place on the carrier.

15. The bicycle rack according to claim 13, further comprising a bicycle frame holder mounted to the second end of the cradle arm.

16. The bicycle rack according to claim 12, further comprising an accessory arm attached to and extending out from the upright and wherein the cradle arm is mounted to the accessory arm.

17. The bicycle rack according to claim 16, wherein the cradle arm is rotatably mounted to the accessory arm.

* * * * *